United States Patent Office 2,783,350
Patented Feb. 26, 1957

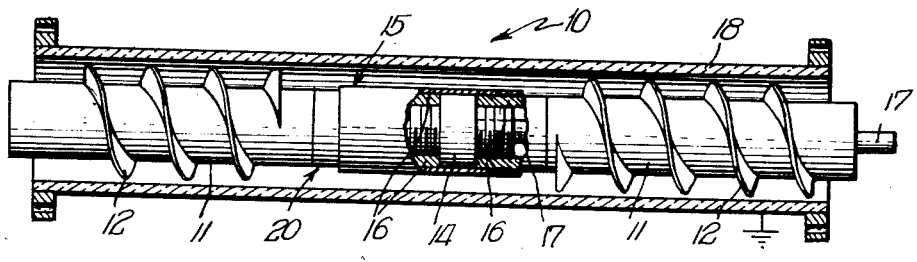
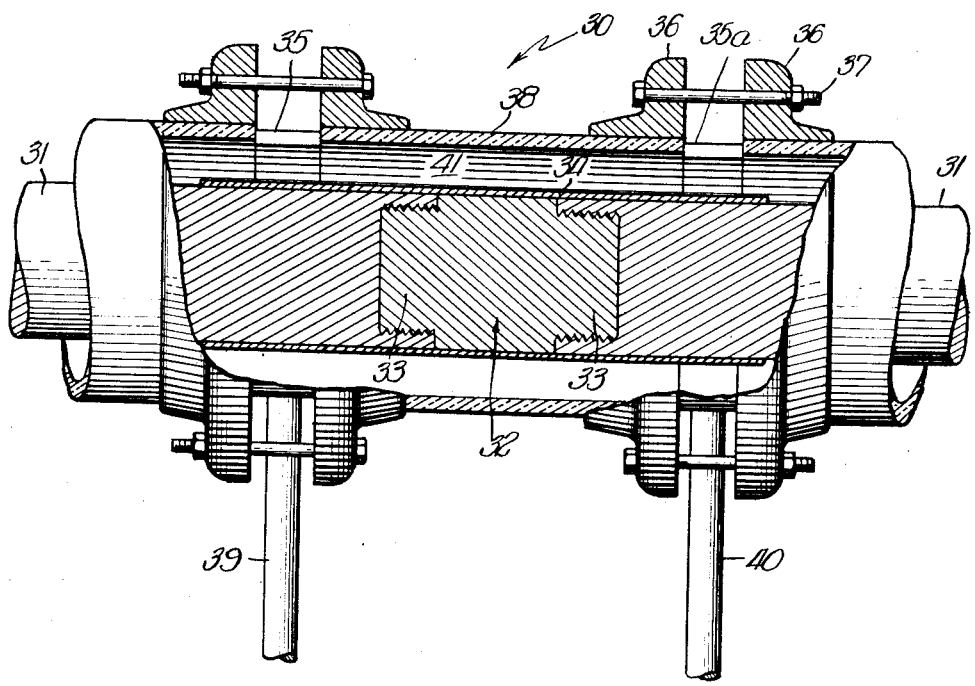
INVENTOR.
Ladislav J. Pircon,

2,783,350

CONTINUOUS THERMATRONIC PROCESSING CELL

Ladislav J. Pircon, Berwyn, Ill., assignor, by mesne assignments, to the United States of America as represented by the Secretary of the Army Application September 14, 1954, Serial No. 455,907

10 Claims. (Cl. 219—10.69)

This invention relates generally to the thermatronic heating or processing of meat.

More particularly, this invention relates to a cell for the continuous processing of comminuted meat, such as luncheon meat, etc., whereby such a product may be continuously processed according to the thermatronic principles explained in my copending application Serial No. 455,945, filed September 14, 1954 and entitled Method of and Apparatus for Thermatronic Heating.

Briefly, the invention herein of subject concerns a thermatronic processing cell in which comminuted meat may be continuously passed and processed.

In one embodiment the cell comprises a tubular housing of electrically conductive material, for example copper, connected to ground to form a first electrode. A pair of screw conveyor sections are mounted concentrically within the tubular housing and such are joined at adjacent ends by a copper coupling having electrical connection with a source of electrical energy to form a second electrode. Meat processed passes along an annular passageway between the housing and conveyor sections and is cooked by the flow of energy passing between the two electrodes.

In a second embodiment the cell consists of a cylindrical insulator tube about which are mounted a pair of spaced ring type electrodes and axially within which are disposed a pair of continuous screw conveyors formed of two sections coupled together by a metal coupling means. The meat being processed passes within the tube between the electrodes and the screw conveyor system; the current passing from one electrode through the meat to the metal coupling interjoining the conveyor screw sections and then back to ground via the meat and the second electrode.

In setting about to perfect such a continuous processing cell, it was found through experimentation that successful processing of meat according to thermatronic principles requires that the energy be passed through a regularly shaped cross section of meat to avoid thermal localization. In batchwise processing, a circular cross section is found to be most successful. An irregular cross section, such as a pear shape, results in the burning of sections of the meat, especially in the case of ham. It is also obvious that tubing or piping is most acceptable as a conduit means for the passage of fluidized solid because of its commercial availability and the ease of its fabrication into a desired assembly. Therefore, I set about to perfect a somewhat tubular type of processing cell in which the ground luncheon meat could be pushed by means of screw conveyors between spaced electrodes. It was also discovered that such electrodes were required to provide sufficient resistance for the high-frequency current generator employed as an energy source and that in certain instances where geometric limitations prevent proper distance between the electrodes, a multi-path electrode system could be employed.

Accepting the above principles, I have devised a pair of continuous processing cells, the features of which will be discussed in detail hereinafter.

The main object of this invention is to provide a new and improved continuous processing cell for the thermatronic processing of comminuted meat.

Another object of this invention is to provide a new and improved continuous processing cell for the thermatronic heating of comminuted meat in which means are provided to process generally uniform geometrical cross sections of the meat thereby to prevent thermal localization.

Still another object of this invention is to provide an improved continuous processing cell for comminuted meat whereby the same may be processed in a uniform and efficient manner.

The above and further objects, features and advantages of my present invention will be recognized by those familiar with the art from the following detailed description and specification concerning a preferred and a modified embodiment of its principles and features as illustrated in the accompanying drawings.

In the drawings:

Figure 1 is a schematic view in substantial side elevation, with parts thereof shown in cross section, to illustrate the features and concepts of a preferred form of thermatronic continuous processing cell;

Figure 2 is a partial side elevational view with parts thereof broken away in section, similar to Figure 1, but at an enlarged scale thereover, illustrating the features and concepts of a first modified form of the continuous processing cell of this invention.

Turning now to the processing cell 10 illustrated in Figure 1 of the drawings, it will be seen that such device compromises two nylon shaft members 11—11 each bearing screw or helical flight members 12—12. For sake of convenience in cleaning such conveyors the shaft members 11 may be formed of two coaxially interfitted portions as shown. In any event adjacent ends of the shaft sections 11—11 are interconnected by a solid copper coupling 14 having a layer of aluminum foil 15 wrapped securely thereabout. In point of fact the coupling 14 is threadedly joined to internally threaded female end portions 16—16 of the nylon shaft sections 11—11 and the foil 15 securely wrapped around the entire coupling connection between such shaft sections.

A copper electrode rod 17 passes coaxially through one of the shaft sections 11 for threaded connection with the copper coupling 14. The entire conveyor shaft assembly comprising the shaft sections 11—11, coupler 14 and aluminum foil 15 are mounted concentrically within a length of copper tubing 18. The copper tubing 18 is connected electrically to ground to comprise a ground electrode for the cell.

It will be recognized that an annular spacing 20 is provided intermediate the shaft sections 11—11 and the outer copper tube 18. This spacing or passageway is utilized for the travel of the comminuted meat being processed in the cell. The path of electrical energy flow is via the connector rod 17 to the solid copper coupling 14 thence through the aluminum foil 15 to the meat within the chamber 20. Energy passes through the meat in the chamber 20 to the boundary electrode or tube 18. Mechanically speaking, the cell of Figure 1 is acceptable, but it is a point of fact that a distance between electrodes equal to at least, if not greater than the width of the hot electrode, or in this case, the copper coupling 14, is desired to provide an acceptable resistance for the high-frequency generator used as a source of the heating energy. As a result of this limitation, a modified form of device or cell 30 illustrated in Figure 2 was developed.

Observing the cell 30 of Figure 2, the same comprises what I term a "multi-path" electrode system comprising a pair of nylon conveyor shaft sections 31—31 constructed substantially as shaft sections 11—11 heretofore described. Such shaft sections are again interconnected by a solid copper coupling 32 having axial hub portions 33—33 which are threaded into the ends of the shaft sections 31. The entire coupling assembly is wrapped with a layer of aluminum foil 34. A pair of circular copper electrode rings 35—35a are held concentrically about the shaft sections 31—31 by means of aluminum flange members 36 and holding bolts 37. The two electrodes 35—35a are separated by a section of boro-silicate glass pipe, indicated at 38. One of the electrodes 35 is connected by conductor 39 to the source of electrical energy while the other electrode 35a is connected by conductor 40 to ground. Again, in this modified form of cell, an annular chamber 41 is provided intermediate the shaft sections and the boro-silicate glass tube 38 for the passage of the meat being processed.

The path of current flow in the modified cell 30 leads from the generator via electrical conductor 39 to the first electrode ring 35. Energy then passes through the meat in chamber 41 to the aluminum foil 34 and the copper coupling connector 32. From the aluminum foil 34 the energy flows back through the meat in chamber 41 to the electrode ring 35a and thence to ground via conductor 40.

It will be appreciated that the device 30 of Figure 2 differs from the Figure 1 device in that increased resistance is presented by the double passage of the current through the meat. Specifically, using a tubing 38 in the Figure 2 device of the same diameter as tube 18 used of the Figure 1 device, results in doubling the energy path in the Figure 2 device over that of the Figure 1 device. Likewise, the area for energy travel in device 30 is cut in half over the device 10, while resistance to current flow has been quadrupled. It will thus be seen that the device 30 of Figure 2 provides an effective means of increasing resistance to a level accommodating the high-frequency current generated by the commercial high-frequency generator employed.

From the above description and specification, it will be recognized that I have herein disclosed the features and principles of an improved continuous processing cell for employing thermatronic principles in the processes of comminuted meat, especially.

While I realize that various changes, modifications and substitutions of equivalent materials may be employed in practicing this invention, it is nevertheless thought that such changes will not necessarily depart from the spirit and scope of the invention involved. As a consequence, it is not my intention to be limited to the particular forms of the invention herein disclosed and described, except as may appear in the following appended claims.

I claim:

1. A cell for the continuous thermatronic processing of comminuted meat, comprising, a tubular processing chamber including electrically conductive electrode defining structure, a pair of screw conveyor sections mounted concentrically within said tubular chamber, an electrically conductive coupling means coaxially joining adjacent ends of said conveyor sections and defining with said tubular chamber a generally annular passageway for meat, and means for causing a flow of electrical energy between said coupling and said electrode defining structure to uniformly process meat being conveyed along said passageway by said conveyor sections.

2. A cell for the continuous thermatronic processing of comminuted meat, comprising, an electrically conductive tubular electrode member defining an elongated cylindrical processing chamber, a pair of screw conveyor sections mounted concentrically within said chamber, an electrically conductive coupling means coaxially joining adjacent ends of said conveyor sections and defining with said tubular member a generally annular passageway for meat, means connecting said electrode member to ground, and electrically conductive means mounted coaxially through one of said conveyor sections and connecting said coupling means to a source of electrical energy, whereby current passes from said coupling means to said electrode member to thermatronically heat meat being conveyed along said annular passageway by said conveyor sections.

3. A cell for the continuous thermatronic processing of comminuted meat, comprising, a tubular member of insulating material defining an elongated substantially cylindrical cooking chamber, a pair of screw conveyor sections mounted concentrically in said chamber, an electrically conductive coupling means coaxially joining said conveyor sections, the latter of which define a generally annular passageway with said tubular member for the movement of meat therebetween, a pair of electrode ring members mounted in spaced relation along said tubular member, means connecting one of said ring members to ground and the other to a source of electrical energy whereby meat conveyed along said annular chamber is processed by the passage of electrical energy between said coupling device and said two ring members.

4. A cell for the continuous thermatronic processing of comminuted meat, comprising, an electrically conductive tubular member defining an elongated cylindrical cooking chamber, a pair of screw conveyor sections mounted concentrically within said tubular member and defining with the latter a generally annular passageway for meat, an electrically conductive coupling device coaxially joining adjacent ends of said conveyor sections, an electrically conductive foil means encasing said coupling means, means connecting said tubular member and coupling device in circuit with a source of high-frequency electrical energy whereby current may be passed between said tubular member and said foil means to process meat being conveyed along said annular chamber by the rotation of said conveyor sections.

5. A cell for the continuous thermatronic processing of comminuted meat, comprising, a tubular member defining a generally elongated cylindrical cooking chamber, a pair of screw conveyor sections mounted concentrically within said tubular member and defining with the latter a generally annular passageway for meat, an electrically conductive coupling device coaxially joining adjacent ends of said conveyor sections, a pair of ring shaped electrodes mounted in spaced relation along said tubular member, conductor means connecting one of said ring shaped electrodes to a source of electrical energy and the other of said ring shaped electrodes to ground whereby meat conveyed along said annular passageway by the rotation of said conveyor sections is subjected to thermatronic processing by the passage of current from said one ring shaped electrode to said coupling device and from said coupling device to said other ring shaped electrode.

6. The device of claim 1 in which said coupling device is surrounded by electrically conductive foil in surface contact with the meat being conveyed in said annular chamber.

7. The device of claim 5 in which said coupling device is surrounded by electrically conductive foil in surface contact with meat conveyed along said annular passageway.

8. A cell for the continuous thermatronic processing of material passing through the same comprising a tubular processing chamber including electrically conductive electrode defining structure, a screw conveyor means mounted in coaxial relation with said tubular chamber to define an annular passageway for material to be processed, said screw conveyor including electrically conductive structure along at least a portion of its length intermediate the ends thereof defining an electrode coaxially disposed with respect to said tubular chamber, and means for causing a flow of electrical energy between said electrodes for processing material conveyed along said annular passageway by said screw conveyor means.

9. A cell for the continuous thermatronic processing of material passing through the same comprising a tubular processing chamber having at least a portion of its inner side wall of electrically conductive material to form an elongated generally tubular electrode, screw conveyor means mounted in coaxial relation with said tubular chamber to define an annular passageway for material to be processed, said screw conveyor having electrically conductive means along at least a portion of its length forming an electrode coaxially disposed with respect to the electrically conductive portion of said tubular chamber and means for causing a flow of electrical energy between said electrodes for processing material conveyed along said annular passageway by said screw conveyor means.

10. A cell for the continuous thermatronic processing of material passing through the same comprising a dielectric tubular processing chamber, a pair of electrodes disposed in non-conducting axially spaced relation in said chamber, said electrodes having exposed inner side walls concentric with the inner side wall of said chamber, screw conveyor means mounted concentrically within said tubular chamber to define an annular passageway for material to be processed including electrically conductive means forming an electrode concentric with said tubular chamber at least along the portion thereof in which said spaced electrodes are located, means for grounding one of said spaced electrodes, and means for connecting the other of said spaced electrodes to a source of electrical energy.

References Cited in the file of this patent

UNITED STATES PATENTS

| | | |
|---|---|---|
| 2,542,702 | Prow | Feb. 20, 1951 |
| 2,620,172 | Jenett et al. | Dec. 2, 1952 |

FOREIGN PATENTS

| | | |
|---|---|---|
| 517,798 | Great Britain | Feb. 8, 1940 |
| 605,589 | Great Britain | July 27, 1948 |